I. S. KILGORE AND L. R. BONE.
CHECK VALVE STRUCTURE FOR WATER PUMPS AND THE LIKE.
APPLICATION FILED MAR. 5, 1921.
1,430,818.
Patented Oct. 3, 1922.
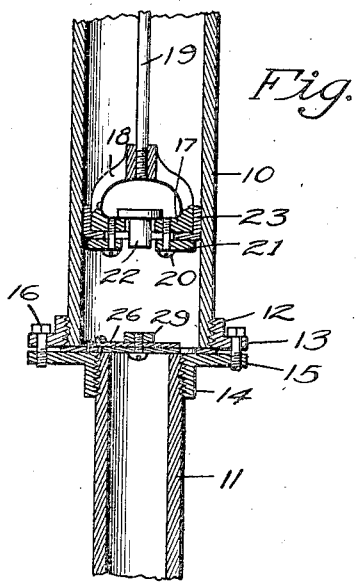
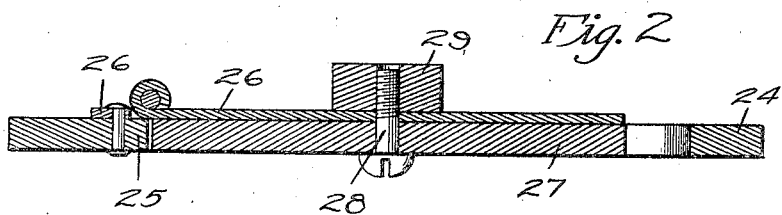
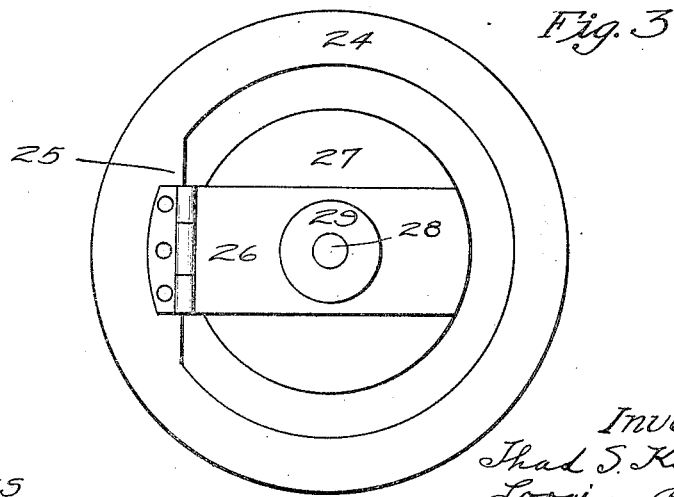
Witness
Lynn Latta
Inventors
Thad S. Kilgore
Lorain R. Bone
By Bair & Freeman Attorneys Patented Oct. 3, 1922.

1,430,818

UNITED STATES PATENT OFFICE.

THAD S. KILGORE AND LORAIN R. BONE, OF BOULDER, COLORADO.

CHECK-VALVE STRUCTURE FOR WATER PUMPS AND THE LIKE.

Application filed March 5, 1921. Serial No. 449,847.

*To all whom it may concern:*

Be it known that we, THAD S. KILGORE and LORAIN R. BONE, citizens of the United States, and residents of Boulder, in the county of Boulder and State of Colorado, have invented a certain new and useful Check-Valve Structure for Water Pumps and the like, of which the following is a specification.

The object of our invention is to provide a check valve structure for water pumps and the like, which valve structure is of very simple, durable and inexpensive construction.

In ordinary pumps, such as hand pumps and those operated by windmills and the like, for pumping water from wells, it is common to use a check valve comprising a piece of leather, having a central check valve member cut from the body of a leather disc and connected therewith at a narrow neck or connecting part. In the use of such a check valve made entirely of leather, the leather is subject to constant contact with water and becomes hard and breaks at its hinge point, so that it must be repaired rather frequently. The repair of such check valve is somewhat difficult and involves considerable work, because the pump tubing must be withdrawn from the well.

It is our object to provide a check valve, whereby the difficulties inherent in the ordinary check valves of the type mentioned are overcome, and for such purpose, it is our object to provide a check valve comprising an annular ring member of leather or the like adapted to form a gasket and also a support for a check valve member, and to provide in connection with such ring, a check valve member of leather or rubber or the like, and to connect the ring or check valve member by means of a metal hinge, which will last for a long time in water without wearing out, and which will operate freely and easily at all times.

With these and other objects in view, our invention consists in the construction, arrangement and combination of the various parts of our device, whereby the objects contemplated are attained, as hereinafter more fully set forth, pointed out in our claim, and illustrated in the accompanying drawings, in which:

Figure 1 shows a vertical, sectional view through the lower part of the pump cylinder and the water pipe connected with the bottom thereof, the piston and the check valve.

Figure 2 shows a vertical, sectional view through our improved check valve; and

Figure 3 shows a top or plan view of our check valve.

In the accompanying drawings, we have used the reference numeral 10 to indicate generally a pump cylinder. Connected with the lower end of the pump cylinder is a water pipe 11. The cylinder and pipe may be connected in a great variety of ways.

In the particular form of the device shown herein, we have illustrated as mounted on the lower end of the cylinder 10 an internal screw-threaded collar or sleeve 12, having at its lower edge the annular circumferential flange 13.

Screwed on the upper end of the pipe 11 is a substantially similar collar 14, having at its upper end an annular circumferential flange 15.

The flanges 13 and 15 may be connected together by screw bolts or the like 16.

Received in the cylinder 10 is a piston comprising the body member 17 above which is the yoke 18 connected with the piston rod 19. Secured to the body 17 by means of screw bolts 20 is a ring 21.

The body 17 has a hole extending through it to receive the valve 22. A leather ring or washer 23 has its inner edge received between the ring 21 and the jaw 17 and is of greater diameter than the interior of the cylinder 10, so as to be bent to cup-shape, as shown in Figure 1.

Our improved check valve comprises an annular ring 24 preferably of leather, rubber or the like, having at one side, as at 25, a portion somewhat wider than the rest of the ring to provide a suitable means, to which a hinge may be secured.

Connected with the portion 25 is a hinge 26. The ring 24 is designed to be mounted between the cylinder and the pipe 11.

In the form of our invention shown herein, the ring 24 forms a gasket between the lower end of the cylinder and the flange 15.

A check valve member 27 has the form of a circular disc made of leather or rubber adapted to rest on the upper end of the pipe 11, as shown for instance in Figure 1. The check valve 27 is of less diameter than the ring 24 and is spaced from the ring 24, as illustrated for instance in Figures 2 and 3.

The hinge 26 is secured to the check valve member 27 by means of a screw bolt 28 projected upwardly through the check valve and the hinge.

There may be screwed onto the upper end of the screw bolt 28 a weight 29, having a screw-threaded hole thus forming a heavy nut that serves the purpose.

It will be seen that with our improved check valve structure, the check valve member proper 27 is connected with the member 24 by means of a metallic hinge or the like 26, which may be of brass or other metal, which will not readily corrode or wear out.

The weight 29 may be made of any proper size to adapt the check valve to the particular well in which it is installed.

With a check valve of this type, the check valve proper 27 will work freely at all times and will not tend to become stiff, as sometimes occurs with the leather check valve.

The hinge would not wear out as does the leather hinge of the ordinary valve, and the necessity for frequent repairs would be obviated.

Some changes may be made in the arrangement and construction of the various parts of our device, without departing from the essential features and purposes of our invention, and it is our intention to cover by our claim, any modified forms of structure or use of mechanical equivalents, which may be reasonably included within their scope.

We claim as our invention:

In a device of the class described the combination of a cylinder having at its lower end an adjustable annular flange, a pipe of smaller diameter aligned therewith below the cylinder having at its upper end an adjustable flange, a valve comprising an annular member received between said cylinder and last flange and forming a gasket, a valve member adapted to seat on the upper end of said pipe, a noncorrosive hinge connected to said annular member, a bolt extended through said valve and a member of the hinge, and a nut on said bolt for securing it in place and serving as a weight.

Des Moines, Iowa, February 21, 1921.

THAD S. KILGORE.
LORAIN R. BONE.